(12) United States Patent
Toupal et al.

(10) Patent No.: US 11,815,984 B2
(45) Date of Patent: Nov. 14, 2023

(54) ERROR HANDLING IN AN INTERCONNECT

(71) Applicant: Intel Corporation, Santa Clara, CA (US)

(72) Inventors: Tina C. Toupal, Portland, OR (US); Shamsul Abedin, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 685 days.

(21) Appl. No.: 16/784,768

(22) Filed: Feb. 7, 2020

(65) Prior Publication Data
US 2020/0174873 A1 Jun. 4, 2020

(51) Int. Cl.
| | |
|---|---|
| G06F 11/07 | (2006.01) |
| G06F 15/78 | (2006.01) |
| H04L 12/54 | (2022.01) |
| G06F 13/40 | (2006.01) |
| H04B 10/80 | (2013.01) |
| G06F 9/48 | (2006.01) |

(52) U.S. Cl.
CPC ........ *G06F 11/0757* (2013.01); *G06F 9/4812* (2013.01); *G06F 13/4068* (2013.01); *G06F 15/7807* (2013.01); *H04B 10/801* (2013.01); *H04L 12/5601* (2013.01)

(58) Field of Classification Search
CPC ............. G06F 11/0757; G06F 13/4068; H04L 12/5601
See application file for complete search history.

(56) References Cited

U.S. PATENT DOCUMENTS

| | | | |
|---|---|---|---|
| 8,446,903 B1 | 5/2013 | Ranganathan et al. | |
| 8,829,918 B2* | 9/2014 | Sylvester | H01L 23/50 324/757.04 |
| 2010/0246594 A1 | 9/2010 | Klinglesmith et al. | |
| 2010/0278195 A1 | 11/2010 | Wagh et al. | |
| 2013/0159587 A1* | 6/2013 | Nygren | G11C 5/063 710/306 |
| 2016/0012010 A1 | 1/2016 | Ganapathy et al. | |

OTHER PUBLICATIONS

Extended European Search Report dated May 19, 2021 for Application No. /Patent No. 20207957.0-1224.

* cited by examiner

*Primary Examiner* — Nadeem Iqbal
(74) *Attorney, Agent, or Firm* — Fletcher Yoder, PC

(57) ABSTRACT

A system level error detection and handling of the network IO in a multi-chip-package (MCP) die is provided. The error detection and handling mechanism conceived may be used between a system-on-chip (SoC) die and a different type of die, such as a die manufactured by a third-party (e.g., a high-bandwidth network IO die). To provide a timely indication in case of any part of the network is at fault, a control unit on the SoC die handles error detection on the network IO links using various indicators. After errors are detected, the control unit groups the errors into two categories: a link failure and a virtual channel failure. Such an error handling mechanism may consolidate the actions and provide consistency in hardware behavior.

20 Claims, 4 Drawing Sheets

ERROR HANDLING IN AN INTERCONNECT

GOVERNMENT LICENSE RIGHTS

This invention was made with government support under Agreement No. HR0011-17-3-0004, awarded by DARPA. The government has certain rights in the invention.

BACKGROUND

The present disclosure relates generally to error handling in an interconnect of an integrated circuit device. More particularly, the present disclosure relates to a control unit that provides system level error detection and handling of network input-output (IO) communications.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

As global data grows, semiconductor chip manufacturers continue to develop advanced chips and devices with high-bandwidth network IOs. Such high-bandwidth chips and devices may include processors for computer systems, motherboard chips, network interface controllers and integrated circuits (ICs), graphics chips, embedded processors and other devices that may be related to high-speed computing and/or electronic communications.

Chips and devices with high-bandwidth network IO may rely on fast links with high bandwidth, low latency, and scalability. However, timely error detection and handling of the network IO on a system level may be challenging for systems with highly integrated chips or devices. For example, a system may include a main component (e.g., a system-on-a-chip) with a first error handling method, while other auxiliary components may have different error handing mechanism(s). This may arise, for example, when different components are developed or manufactured by different entities that use different error-handling methods.

BRIEF DESCRIPTION OF THE DRAWINGS

Advantages of the present disclosure may become apparent upon reading the following detailed description and upon reference to the drawings in which.

DETAILED DESCRIPTION OF SPECIFIC EMBODIMENTS

Figure 1:
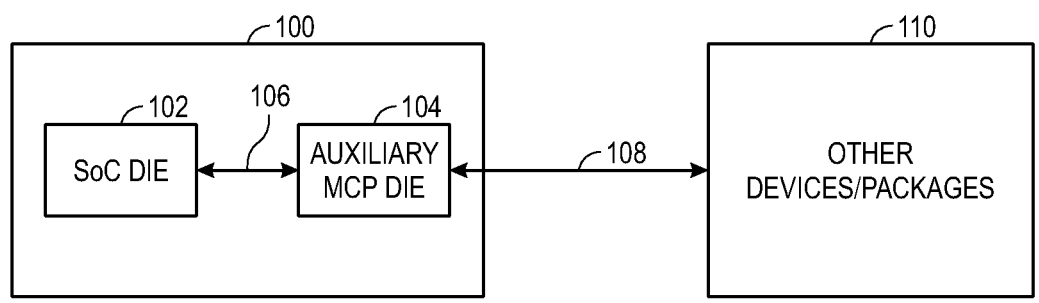
FIG. 1 is a block diagram of a multi-chip package (MCP) that may include a package containing a system-on-chip (SoC) die and an auxiliary MCP die and other devices or packages, in accordance with an embodiment.

One or more specific embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. The techniques presented and claimed herein are referenced and applied to material objects and concrete examples of a practical nature that demonstrably improve the present technical field and, as such, are not abstract, intangible or purely theoretical.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B.

As data-driven businesses evolve, semiconductor chip manufacturers are continually focused on the speed and accuracy of communications for point-to-point network IO components, which are often provided by third-party suppliers with high bandwidth, low latency, and flexible scalability. To develop systems that integrate highly modular components from the third-party suppliers, the semiconductor chip manufacturers may face new challenges due to the way that the network IO components are fabricated and/or implemented. For example, a third-party network IO component may have different error detection and handling mechanisms than those used for a system-on-chip (SoC) die in the same multi-chip package (MCP).

An MCP is an electronic assembly on which multiple integrated circuits (ICs or chips), semiconductor dies and/or other discrete components may be integrated. The individual chips or semiconductor dies may be split into smaller chiplets or dies to facilitate performance improvement and reduce cost. For example, smaller chiplets or dies may enable more transistors to split across multiple chiplets easily so that more ICs can be put on one wafer. Additionally, smaller chiplets or dies may have reduced risks of being defective due to an introduction of unwanted materials during semiconductor fabrication of the smaller chiplets or dies.

A semiconductor die (referred to as a die for simplicity) in the context of integrated circuit is a small block of semiconducting material on which a given functional circuit is fabricated. For example, an SoC die may integrate multiple components of computing devices (e.g., processing unit, memory, graphic interfaces, IO ports, and other relevant elements) into a single microchip. A more tightly integrated system design in the SoC die may improve performance, reduce cost (e.g., by reducing power consumption), and enable efficient integration across different components of the SoC die. Another example is a network IO die that may be used to handle intercommunications between different dies to maintain a high-bandwidth network IO.

With the foregoing in mind, FIG. 1 illustrates a block diagram of a multi-chip package (MCP) that includes a package 100 and other devices or packages 110. The package 100 includes an SoC die 102 and an auxiliary MCP die 104. The auxiliary MCP die 104 may be used to support the SoC die 102. For example, the auxiliary MCP die 104 may be a network IO die that provides high bandwidth throughput for the SoC die 102 to and/or from the other devices or packages 110. The auxiliary MCP die 104 may be developed by a third-party supplier, or by a different part of the same company that manufactures the SoC die 102. The other devices or packages 110 may include similar SoC die(s) as the SoC die 102 and/or similar MCP die(s) as the auxiliary MCP die 104 and/or different die entirely.

The interconnection and communication between the SoC die 102 and the auxiliary MCP die 104 are carried by a link 106. For example, the link 106 may include a high-speed die-to-die interconnect bus (e.g., a parallel data bus). The interconnection and communication between the package 100 and the other devices or packages 110 are carried by a link 108. For example, the link 108 may include an optical link and/or another suitable link type for providing high bandwidth and low latency network IO between the package 100 and the other devices or packages 110.

The intercommunication between different dies (e.g., the SoC die 102 on the package 100 and another die on one of the other devices or packages 110) may use a packet switching method that groups transmitted data into packetized messages. As such, packets may include a header and/or a footer (containing control information) and a payload (containing user information). The control information may provide data for network devices to direct the payload to its destination where the payload is extracted and used (e.g., by an application software program). For example, a header and/or a footer may include source and destination (such as network addresses), error detection codes, sequencing codes, and the like.

Figure 2:
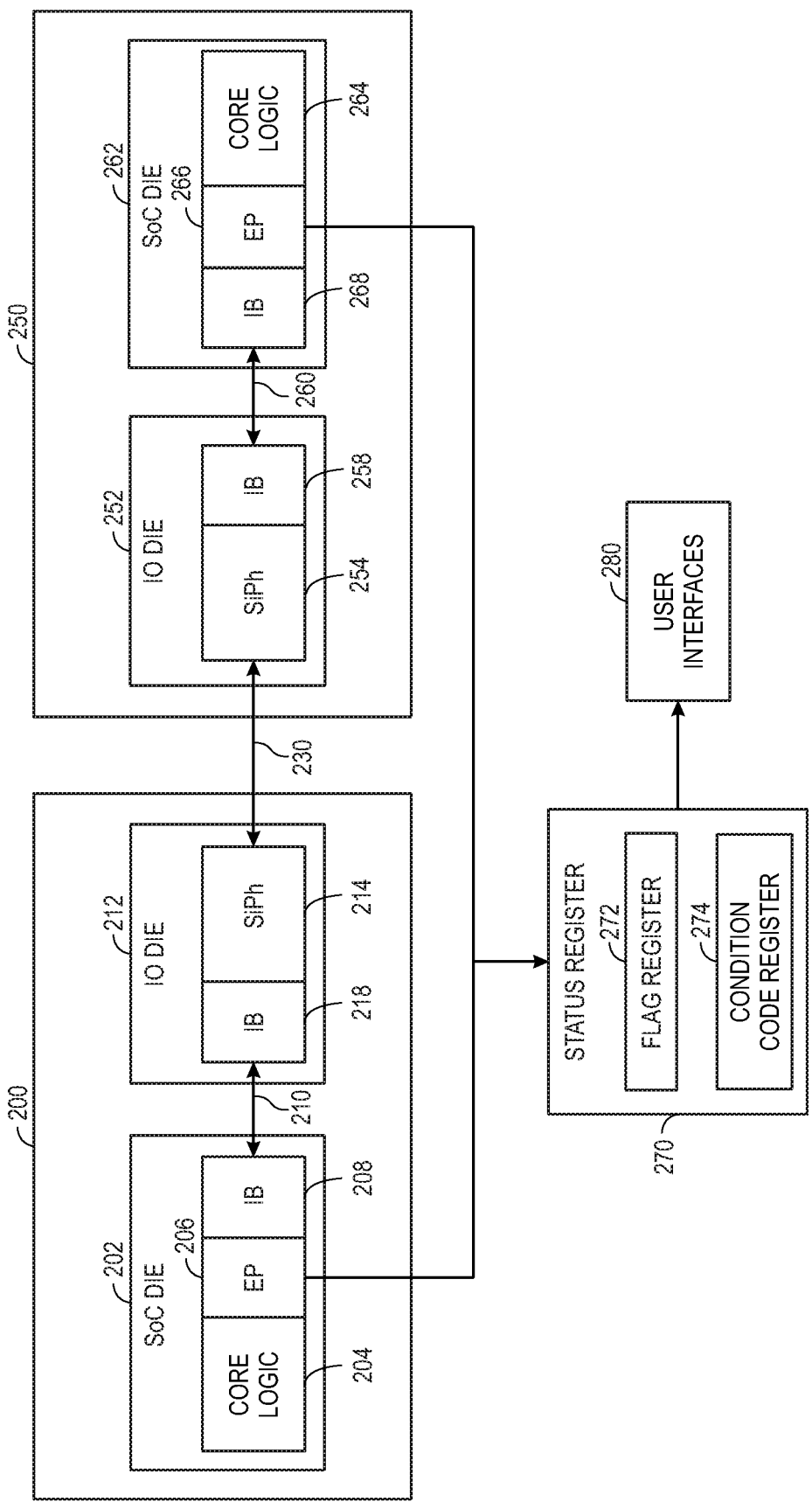
FIG. 2 is a block diagram of an example of the MCP of FIG. 1 that may include SoC dies and network IO dies, in accordance with an embodiment.

FIG. 2 shows a block diagram of an embodiment of the MCP of FIG. 1. The example MCP includes two packages with similar configurations. For instance, the MCP may include a package 200 that contains an SoC die 202 and an IO die 212. The MCP may also include a package 250 that contains an SoC die 262 and an IO die 252. The SoC dies 202 and 262 may carry main functions of the respective packages 200 and 250. The IO dies 212 and 252 may provide high-bandwidth network IO for respective SoC dies 202, 262. The IO dies 212 and 252 may be viewed as a physical link controlled by a respective end point.

As illustrated, the SoC die 202 includes a core logic 204, an endpoint (EP) 206, and an interconnect bus (IB) 208. For example, the core logic 204 may include a semiconductor intellectual property core of a programmable logic device, such as a field-programmable gate array (FPGA). The IO die 212 includes an IB 218 and a silicon photonics (SiPh) interface 214. The IBs 208 and 218 are die-to-die interconnects that may provide high-bandwidth and low-latency multi-channel physical layer (PHY) intended for interconnecting multiple dies mounted within a package (e.g., the SoC die 202 and the IO die 212 mounted within the package 200). The IO die 212 may be viewed as a physical link controlled by the EP 206. The SoC die 202 and the IO die 212 are connected by an interconnection 210. Similarly, the SoC die 262 includes a core logic 264, an endpoint (EP) 266, and an IB 268. The IO die 252 includes an IB 258 and an SiPh interface 254. The IO die 252 may be viewed as a physical link controlled by the EP 266. The SoC die 262 and the IO die 252 are connected by an interconnection 260. The package 200 and package 250 are connected by an interconnection 230 via the SiPh interfaces 214 and 254.

The SiPh interfaces 214, 254 are a network IO chiplet that uses optical links for data transmission with low decibel (dB) loss with a low energy cost. As a standalone chiplet, the SiPh interfaces 214, 254 may be integrated into an MCP to provide a high-bandwidth throughput. For example, the SiPh interface 214 and the SiPh interface 254 provide high-bandwidth network IO for intercommunication between the SoC die 202 and the SoC die 262.

The IBs 208, 218, 258, or 268 may include high-speed parallel data buses providing an interface from the SiPh interfaces 214, 254 of the respective IO dies 212, 252 to the respective SoC dies 202, 262. In other words, the IB 218 provides an interface from the SiPh interface 214 to the SoC die 202 via the IO die 212, and the IB 258 provides an interface from the SiPh interface 254 to the SoC die 262 via the IO die 252.

For example, the IBs 208, 218, 258, or 268 may use Intel's Advanced Interface Bus (AIB), which is a die-to-die physical layer (PHY) level standard that enables a modular approach to system design with a library of chiplet intellectual property (IP) blocks. Each IP block may contain a prepackaged function that has been through several stages of design and verification. In some embodiments, the IP block may be a reusable unit of logic/functionality or a layout design developed as building blocks in different chip designs.

In package 200, the IB 208, the interconnection 210, and the IB 218 may form an IB link providing high-speed die-to-die communications between the SoC die 202 and the IO die 212. Similarly, in the package 250, the IB 258, the interconnection 260, and the IB 268 may form another IB link providing high-speed die-to-die communications between the SoC die 262 and the IO die 252. In addition to the die-to-die IB links, the SiPh interface 214, the interconnection 230, and the SiPh interface 254 may form an SiPh link (an optical link) providing high bandwidth package-to-package network communications between the package 200 and the package 250. The IB links and the SiPh link are combined to provide a point-to-point network IO with high bandwidth, low latency, and scalability.

Although the illustrated embodiments show an SiPh connection between packages 200, 250 and IB connections between the respective SoC dies 202, 262 and the respective IO dies 212, 252, some embodiments may include additional and/or alternative data communication protocols, such as other optical and/or electrical protocols for providing interconnections between the various portions of the packages 250, 250.

Maintaining a high-bandwidth network IO for a tightly integrated MCP relies on a timely error detection and handling mechanism, which may be challenging for MCPs that include multiple interconnection types with different error detection and/or handling mechanisms. The SoC dies 202 and 262 may be fabricated by a main semiconductor manufacturer with a main SoC error handler. However, both the SiPh interfaces 214, 254 and the Ms 208, 218, 258, or 268 may be developed by separate suppliers (e.g., different part(s) of the same company that manufactures the SoC dies 202 and 262, and/or external suppliers) with different error detection and handling mechanism(s).

For example, at initial boot or after each system reset, both the SiPh links and the IB link may use their own training sequences for error detection, error handling, and the like. During this particular time, unexpected stalling may occur on either the SiPh or the IB links due to a number of network issues, which may cause the entire system to hang. There may not be an available error detection and handling mechanism for the training sequence of the individual auxiliary components (such as the SiPh and the IB). Because of the dependency for multiple components (e.g., logic units, functional units, or layout designs) using different interconnection techniques developed by separate suppliers to work together before the packages 200 or 250 can be successfully booted and functioning, the systems and methods of this disclosure may properly detect and handle errors by the system management software or SoC firmware for a timely intervention to avoid shutting down the entire system. It may be costly to reset a large system containing multiple SoC dies and other relevant MCP dies. Therefore, a quick debug and diagnosis mechanism may be a beneficial solution to handle such errors without impacting the rest of the system.

To provide a timely indication in case of any part of the network experiencing an error, the endpoint (EP) is created for the IB interface on the SoC main die serving as a control unit. For example, the EP 206 on the SoC die 202 may handle error detection on the IB link formed by the IBs 208 and 218 and/or error detection on the SiPh link formed by the SiPh interfaces 214 and 254s. After error detection, the EP 206 may group the errors into categories: a link failure, a virtual channel failure, and/or other error types. Each of the error groups may be assigned a unique error code, which may be carried in a packet header. Such error handling may consolidate the actions and provide consistency in the hardware behavior in the packages 200 and/or 250.

An EP may include memory and/or logic (implemented as software executed by a processor of the core logic 204 and/or implemented in hardware). The EP connects one IP block with another IP block. The EP may regulate the data transfers between the IP blocks. The EP may provide settings for certain registers. The EP may include a memory unit that is used to store data, such as the data exchanged between individual IP blocks, IP block status, link error codes, and the like. Additionally, the EP may report certain type(s) of data to an upper level control unit or system. For example, the EPs 206 and 266 (also called IB shims) in FIG. 2 may report the detected errors to the main SoC error handler using an SoC reporting mechanism. Meanwhile, it may take multiple steps to flush in-flight packets and block incoming network traffic. To restore faulted links, certain routines may be used to perform a reset through the IB shim. The various error causes may be captured in a status register 270, which is exposed to user interfaces 280 such as PCIe (peripheral component interconnect express) and JTAG (joint test action group). The status register 270 may include a flag register 272, a condition code register 274, or other type of register.

A virtual channel (VC) may be a communication track between two components giving the bandwidth for the virtual connection across a network. Multiple VCs may map onto a physical link (such as the IB links or the SiPh link). For example, rather than a single deep queue, the physical link may be associated with several VCs, each carrying a small queue (i.e., a collection of data packets). The VCs may be associated with respective physical channels (e.g., optical fibers) allocated independently but competing with each other for bandwidth. The VCs may decouple buffer resources from transmission resources (e.g., transmitters), thereby enabling active packets to pass blocked packets using the network bandwidth to avoid idling/congestion.

Figure 3:
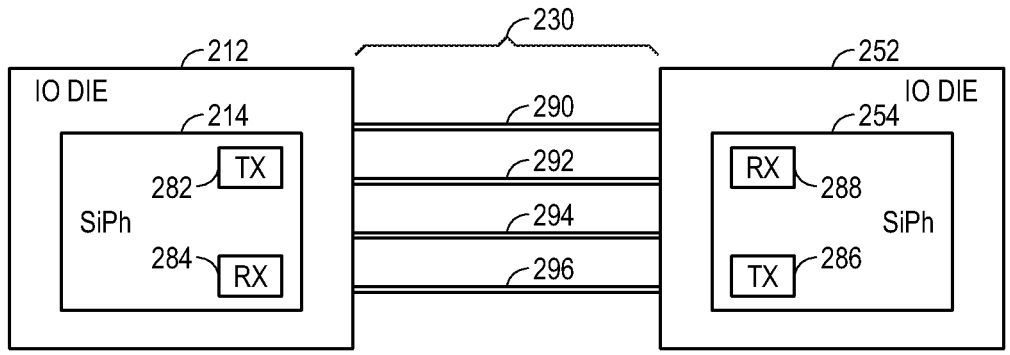
FIG. 3 is a block diagram of virtual channels that may be used by the network IO dies of FIG. 2, in accordance with an embodiment.

With the preceding in mind, in certain embodiments, and as illustrated in FIG. 3, the interconnection 230 may use multiple VCs 290, 292, 294, and 296 in a link, such as the SiPh link between the SiPhs 214 on the IO die 212 and the SiPh 254 on IO die 252. The VCs 290, 292, 294, and 296 may be associated with respective physical channels in the interconnection 230 and/or may share one physical channel by using time-division multiplexing (TDM) or wavelength-division multiplexing (WDM) technology.

As illustrated, the SiPhs 214 and 254 (and/or other interfaces) may include multiple transmitters (TXs) and receivers (RXs) that transmit or receive data packets. For example, via the VC 290, the transmitter 282 may transmit a group of packets from the SiPh 214 to the SiPh 254. The transmitted packets will be received by the receiver 288 on SiPh 254. Similarly, via the VC 296, another group of packets may be transmitted from the transmitter 286 on SiPh 254 to the receiver 284 on SiPh 214.

Figure 4:
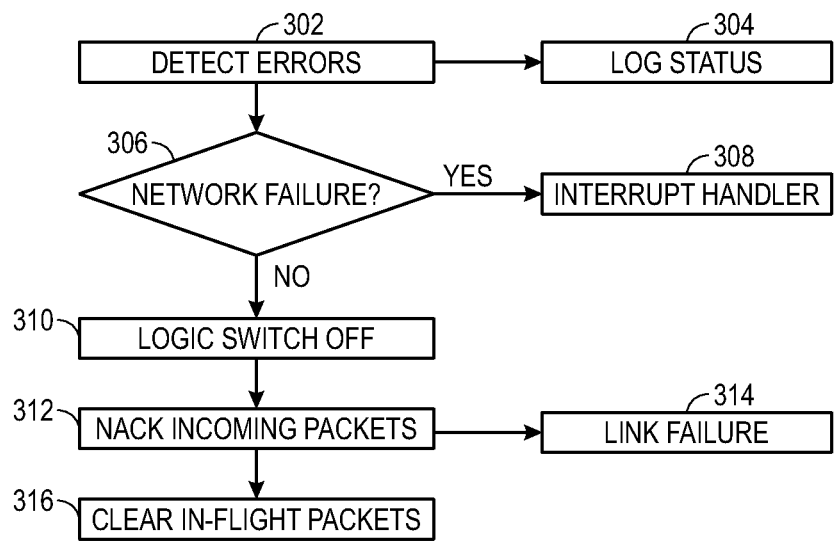
FIG. 4 is a flow diagram illustrating a link failure error detection workflow, which may be used by the example MCP of FIG. 2, in accordance with an embodiment.

FIG. 4 is a flow diagram illustrating a link failure error detection workflow, which may be used in the MCP of FIGS. 1 and 2. The link failure error detection workflow may begin when errors are detected (block 302) on any of the IB links or the SiPh links. The EP 206 may detect any suitable errors. For example, the EP 206 may detect error using timers to detect error(s) on a link. Each of the error conditions may indicate a hardware or link error either on the die-to-die IB link or the network IO (i.e., the SiPh). For instance, the error conditions may include a clock and data recovery (CDR) lock failure, an IB timeout, an endpoint timeout, an SiPh timeout, an optical link failure error, all virtual channels timeout, and/or other link errors.

An IB timeout error or IB calibration timeout error may occur when either the core logic 204, 264 or the IO die 212, 252 or both do not have a transmitter (e.g., the transmitter 282 or 286) or a receiver (e.g., the receiver 284 or 288) transfer enable bit asserted within certain time of a boot and/or other event for the MPC. The TX and RX enable bits may be reported externally from the IB links to the core logic 204, 264 to enable the core logic 204, 264 to track whether an error has occurred be determining whether a timer started after an initial boot or restart of the MPC has elapsed before the TX and/or RX enable bits are received.

The SiPh timeout error or an optical link training timeout error may occur when a Clock and Data Recovery (CDR) lock status bit or a PLL (phase-locked loop) lock status bit is not received within certain time. The SiPh link may send this indicator to the core logic 204, 264 as a status bit.

An endpoint error or an endpoint data and channel alignment timeout error may occur when the alignment training is not complete within a specific time. In other words, the endpoint performs a data alignment sequence on the SiPh links after an initial boot or system reset of the MPR. If the training sequence does not complete within the specific time, the core logic 204, 264 and/or the EP 206, 266 may determine that an endpoint error has occurred.

An optical link failure error may occur when a CDR lock status or a TX PLL lock status indicates there is a failure on the SiPh link. An "all virtual channels timeout error" may occur when a number (e.g., 1, 2, 3, or all) of VCs fail to receive an acknowledgment (ACK) for their respective last packets. Additionally or alternatively, the all virtual channels timeout error may occur when the last packet of the number has been replayed a number (e.g., 1, 2, 3, 4, or more) times within the respective VCs.

Each of the error cause type may be logged into the status register 270 (block 304). Regardless of implementation, the status register 270 may collect status bits (such as status flag bits) and report the collected status bits to a processor (e.g., a processor in the core logic 204 or 264). Each error is subjected to analysis to determine if the error is a network error (block 306). Specifically, the analysis may determine whether the error indicates that the network is down. For example, the optical link error is a type of network error. The error may occur at any time therefore immediate attention may be essential. On the other hand, the occurrence of other errors may be confined to boot time only.

Thus, if the network error is determined to have occurred, an interrupt will be generated and an interrupt handler may be launched (block 308). The interrupt handler may include a block of special routines that are used to implement device drivers or transitions between operation modes. Each of the special routines may be associated with a specific interrupt condition (e.g., caused by a specific error condition).

The interrupt handler may use an interrupt table that contains a table of interrupt vectors. For example, the interrupt table may include pointers pointing to the special routines in the interrupt handler that handle various interrupts. Each pointer may be reserved for a special purpose.

If the detected error is not a network error, a failure signal may be sent to an SoC reset controller to indicate a logical switch off mode (block 310). In comparison to network error such as the optical link error, the other types of errors including timeout errors of the IB links, SiPh link, EP, and VCs, the possibilities of happening outside the initial boot sequence or the system reset sequence is small. During the boot up sequence, an interrupt table may not be set up yet. Therefore, no interrupt is to be generated and a failure indicator to the SoC reset controller may suffice.

A physical link (either the IB link or the SiPh link) may be rendered down into the off mode when one or more error conditions described above are not corrected. The EP 206, 266 may enter the virtual link into the logical switch off mode. During the off mode, all incoming packets may be blocked from entering the respective link while in-flight packets are dropped with the actual physical links being idle.

After the EP 206, 266 enters the logical switch off mode, the EP 206, 266 may respond with a not-acknowledged (NACK) message for all incoming packets (block 312). The incoming packets may be NACK'ed with a specific error code that indicates that a corresponding link error has been detected (block 314) and that the incoming packets are not acceptable and may be rejected. A failed link may be caused by a faulty MCP component and may be taken offline accordingly.

To restore a physical link from a link error, certain routines may be used to initiate a reset in the EP 206, 266, which in turn initiates a retrain sequence, which starts a new training sequence (e.g., the training sequence for the IB or the SiPh). The reset in the EP 206, 266 will clear all in-flight packets (block 316).

Figure 5:
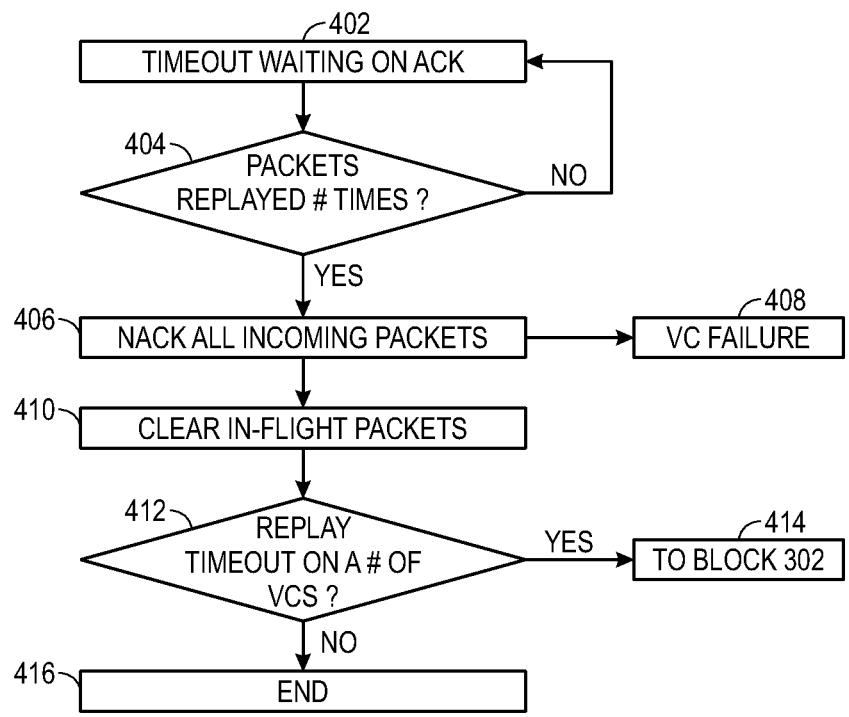
FIG. 5 is a flow diagram illustrating a virtual channel (VC) failure error detection workflow, which may be used by the example MCP of FIG. 2, in accordance with an embodiment.

FIG. 5 is a flow diagram illustrating a virtual channel error detection workflow, which may be used by the example MCP of FIG. 2. The virtual channel error is an error group that may be caused by a virtual channel replay timeout. As previously discussed, at least some of the physical links controlled by the EPs 206, 266 may have several virtual channels. Packets may travel on any of the VCs of the link. Each packet transmission may use an acknowledgement (ACK) once the packet reaches the remote site (e.g., from the SiPh interface 214 to the core logic 204).

When the ACK is not received within a specific amount of time (block 402), the packet will be resent. In the meantime, a replay number counter is incremented and compared against to a specified number (block 404). The specified number may be programmable, ranging from 4 to 8. When the replay number counter reaches the specified number (e.g., a number of 4), the VC may be determined to be broken and unusable. Therefore, all incoming packets for the VC may be NACK'ed (block 406) with a unique error code (e.g., a specific number like 24) that indicates a VC failure has been detected (block 408). After NACK'ing all incoming packets, the in-flight packets will be cleared (block 410).

Since a number of virtual channels may map onto the same physical link, having one of virtual channels un-usable may not indicate a failure of the entire physical link. Thus, only the traffic to that particular VC is blocked while the remaining VCs may still operate as usual, and the EP 206, 266 does not enter the logical switch off mode. The replay timeouts on VCs may be counted by a replay counter that determines whether the number of failed VCs exceed a threshold number (block 412). In some embodiments, the threshold number may include all VCs of the respective link. If the replay timeout on the threshold VCs is not reached, the error detection workflow may reach an end of the workflow that causes the MPC to continue to use the link containing the failed VC (block 416). However, when all VCs of the physical link fails with a replay counter timeout, a broken physical link may be determined and a corresponding error indication is reported to the error detection workflow of FIG. 4 in block 302 (block 414).

Figure 6:
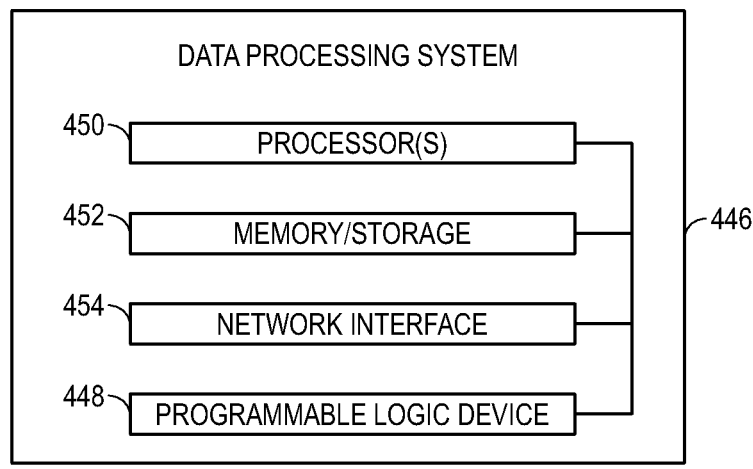
FIG. 6 is a block diagram that may utilize the error handling of FIGS. 4 and 5, in accordance with an embodiment.

The previously discussed interconnection with enhanced end-to-end error handling may be implemented in suitable computing devices. For example, a data processing system 446, shown in FIG. 6, may utilize the foregoing techniques. For example, the data processing system 446 may include a programmable logic device 448 that is a component of a data processing system 446. The data processing system 446 may also include a processor 450, memory and/or storage circuitry 452, and a network interface 454. The data processing system 446 may present viable embodiments that may utilize the error handling between dies/components with different error handling by different manufacturers. The data processing system 446 may include more or fewer components (e.g., electronic display, user interface structures, application specific integrated circuits (ASICs)).

The processor 450 may include any suitable processor, such as an INTEL® XEON® processor or a reduced-instruction processor (e.g., a reduced instruction set computer (RISC), an Advanced RISC Machine (ARM) processor) that may manage a data processing request for the data processing system 446 (e.g., to perform machine learning, video processing, voice recognition, image recognition, data compression, database search ranking, bioinformatics, network security pattern identification, spatial navigation, or the like).

The memory and/or storage circuitry 452 may include random-access memory (RAM), read-only memory (ROM), one or more hard drives, flash memory, or the like. The memory and/or storage circuitry 452 may be considered external memory to the programmable logic device 448 and may hold data to be processed by the data processing system 446. In some cases, the memory and/or storage circuitry 452 may also store configuration programs (e.g., bitstream) for programming the programmable logic device 448.

The network interface 454 may enable the data processing system 446 to communicate with other electronic devices and may perform the communication with error handling. Furthermore, the processor 450, the programmable logic device 448 and/or the memory and/or storage circuitry 452 may utilize different communication features and may benefit from the error handling discussed herein.

In one example, the data processing system 446 may be part of a data center that processes a variety of different requests. For instance, the data processing system 446 may receive a data processing request via the network interface 454 to perform machine learning, video processing, voice recognition, image recognition, data compression, database search ranking, bioinformatics, network security pattern identification, spatial navigation, or some other specialized task.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A tangible, non-transitory, computer-readable medium having instructions stored thereon, wherein the instructions are configured to cause a processor to:
   receive an indication of an error for a link between a plurality of dies of a multi-die system, wherein the link is to enable network communications between the plurality of dies;
   determine whether the error is a network error associated with the network communications;
   when the error is not a network error, logically switch the link off; and
   send a not-acknowledged message in response to incoming packets with an error code indicating a type of link error.

2. The tangible, non-transitory, computer-readable medium of claim 1, wherein the network error occurs during operation of the multi-die system and is not related to an initial boot or restart of the multi-die system, and wherein the processor is configured to invoke an interrupt handler to interrupt the link in response to the network error.

3. The tangible, non-transitory, computer-readable medium of claim 1, wherein logically switching the link off comprises clearing in-flight packets designated to be transferred over the link.

4. The tangible, non-transitory, computer-readable medium of claim 1, wherein the link comprises an advanced interface bus link.

5. The tangible, non-transitory, computer-readable medium of claim 4, wherein the error comprises an advanced interface bus error.

6. The tangible, non-transitory, computer-readable medium of claim 5, wherein the processor is configured to start a timer after an initial boot or restart of the multi-die system, and wherein the indication of the error comprises a duration of the timer elapsing without receiving a transmitter enable bit or a receiver enable bit over the advanced interface bus link.

7. The tangible, non-transitory, computer-readable medium of claim 1, wherein the link comprises a silicon photonics link.

8. The tangible, non-transitory, computer-readable medium of claim 7, wherein the error comprises an optical link training timeout error of the silicon photonics link.

9. The tangible, non-transitory, computer-readable medium of claim 8, wherein the optical link training timeout error of the silicon photonics link comprises a lack of receiving a clock and data recovery lock status bit associated with the silicon photonics link within a threshold of time after a boot of the multi-die system.

10. The tangible, non-transitory, computer-readable medium of claim 8, wherein the optical link training timeout error of the silicon photonics link comprises a lack of receiving a phase-locked loop lock status bit within a threshold of time after a boot of the multi-die system.

11. The tangible, non-transitory, computer-readable medium of claim 1, wherein the error comprises a channel alignment error that occurs when alignment training is not complete within a specific time of a boot of the multi-die system.

12. The tangible, non-transitory, computer-readable medium of claim 1, wherein the link comprises an optical link, and the error comprises an optical link failure corresponding to a threshold number of virtual channels of the optical link have timed out.

13. The tangible, non-transitory, computer-readable medium of claim 12, wherein the threshold number comprises all of the virtual channels of the optical link.

14. A method, comprising:
   determining that a timeout for a virtual channel of a link between a plurality of dies of a multi-die system;
   determining that packets have been replayed over the virtual channel more than a threshold number of attempts and continues to timeout; and
   in response to the packets being replayed more than the threshold number of attempts, disabling the virtual channel.

15. The method of claim 14, wherein the threshold number is a specified number of replays of the packets, ranging from 4 to 8.

16. The method of claim 14, comprising:
   determining that a threshold number of virtual channels of the link have failed; and
   in response to a determination that more than the threshold number of the virtual channels of the link have failed, disable the link.

17. The method of claim 14, comprising:
   determining that fewer than a threshold number of virtual channels of the link have failed; and
   continue using the link while disabling the virtual channel.

18. The method of claim 14, wherein disabling the virtual channel comprises responding to incoming requests to transfer data over the virtual channel with non-acknowledged message indicating that the virtual channel has failed using a corresponding error code.

19. The method of claim 14, wherein disabling the virtual channel comprises clearing in-flight packets that are designated to be transferred over the virtual channel.

20. A method, comprising:
determining that a timeout for a virtual channel of a link between a plurality of dies of a multi-die system;
determining that packets have been replayed over the virtual channel more than a threshold number of attempts and continues to timeout;
in response to the packets being replayed more than the threshold number of attempts, disable the virtual channel;
responding to requests on the disabled virtual channel with a first not-acknowledged response indicating that the virtual channel has failed;
determining that more virtual channels of the link are disabled than a link threshold;
responsive to a determination that more virtual channels of the link are disabled than the link threshold, disabling the link; and
responding to requests on the disabled link with a first not-acknowledged response indicating that the link has failed.

* * * * *